(12) United States Patent
Zhang

(10) Patent No.: US 9,088,499 B2
(45) Date of Patent: Jul. 21, 2015

(54) ROUTING GENERATION FOR IMPLEMENTATION OF FIBER CHANNEL OVER ETHERNET

(71) Applicant: Hangzhou H3C Technologies Co., Ltd., Hangzhou (CN)

(72) Inventor: Changjun Zhang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/372,975

(22) PCT Filed: Feb. 1, 2013

(86) PCT No.: PCT/CN2013/071252
§ 371 (c)(1),
(2) Date: Jul. 17, 2014

(87) PCT Pub. No.: WO2013/113285
PCT Pub. Date: Aug. 8, 2013

(65) Prior Publication Data
US 2014/0376562 A1 Dec. 25, 2014

(30) Foreign Application Priority Data
Feb. 2, 2012 (CN) .......................... 2012 1 0022903

(51) Int. Cl.
| | | |
|---|---|---|
| H04L 12/28 | (2006.01) | |
| H04L 12/56 | (2006.01) | |
| H04L 12/721 | (2013.01) | |
| H04L 12/751 | (2013.01) | |

(Continued)

(52) U.S. Cl.
CPC ............... *H04L 45/12* (2013.01); *H04L 45/02* (2013.01); *H04L 45/026* (2013.01); *H04L 49/351* (2013.01); *H04L 69/24* (2013.01)

(58) Field of Classification Search
None
See application file for complete search history.

(56) References Cited

U.S. PATENT DOCUMENTS

2002/0046271 A1* 4/2002 Huang .......................... 709/223
2006/0140111 A1* 6/2006 Vasseur et al. ................ 370/216
(Continued)

FOREIGN PATENT DOCUMENTS

CN 1647460 A 7/2005
CN 101552936 A 10/2009
(Continued)

OTHER PUBLICATIONS

International Search Report and Written Opinion dated May 9, 2013 issued on PCT Patent Application No. PCT/CN2013/071252 filed on Feb. 1, 2013, The State Intellectual Property Office, the P.R. China.

(Continued)

*Primary Examiner* — Edan Orgad
*Assistant Examiner* — Rebecca Song
(74) *Attorney, Agent, or Firm* — Mannava & Kang, P.C.

(57) ABSTRACT

According to an example, a routing generation method and apparatus is applied in Fiber Channel over Ethernet (FCoE). Based on the additions to the TLV, which may be carried in the Hello packet and the LSP packet, the Hello packet of the ISIS protocol may be used to implement neighbor discovery of the FC protocol, and the LSP synchronization of the ISIS protocol may be used to implement the link information synchronization of the FC protocol. Thus, the FC routing may be generated without the FSPF. Therefore, FCoE may be implemented with a lower cost.

12 Claims, 4 Drawing Sheets

(51) Int. Cl.
*H04L 12/931* (2013.01)
*H04L 29/06* (2006.01)

(56) References Cited

U.S. PATENT DOCUMENTS

| | | | |
|---|---|---|---|
| 2008/0025308 A1* | 1/2008 | Morgan et al. | 370/392 |
| 2008/0159260 A1 | 7/2008 | Vobbilisetty et al. | |
| 2010/0017497 A1 | 1/2010 | Brown et al. | |
| 2011/0299525 A1* | 12/2011 | Peterson | 370/355 |
| 2013/0279513 A1* | 10/2013 | Eastlake, III | 370/410 |

FOREIGN PATENT DOCUMENTS

| | | |
|---|---|---|
| CN | 101605102 | 12/2009 |
| CN | 101741738 | 6/2010 |
| CN | 102215112 A * | 10/2011 |
| CN | 102318287 | 1/2012 |
| CN | 102546426 A | 7/2012 |

OTHER PUBLICATIONS

Zhang Wei-Dong, Abstract on "The Next Generation Data Center Network Virtualization IRF Technology Research", Computer Knowledge and Technology, vol. 7, No. 36, ISSN 1009-3044, Dec. 2011.

Zhou et al., Abstract of "Control Policy Based on Bandwidth and Hop Count for CAC and Routing", Proceedings of the 27th Chinese Control Conference, Jul. 16-18, 2008, Kunming, Yunnan China.

* cited by examiner

ROUTING GENERATION FOR IMPLEMENTATION OF FIBER CHANNEL OVER ETHERNET

CLAIM FOR PRIORITY

The present application is a national stage filing under 35 U.S.C 371 of PCT application number PCT/CN2013/071252, having an international filing date of Feb. 1, 2013, which claims priority to China application number 201210022903.0 having a filing date of Feb. 2, 2012, the disclosure of which is hereby incorporated by reference in its entirety.

BACKGROUND

A core idea of Fiber Channel over Ethernet (FCoE) is to run fabric channel (FC) protocols over Ethernet, so that Ethernet links can be used to replace the FC, thereby realizing network integration and unity.

Accordingly, the implementation of FCoE requires that network equipment in Ethernet will not only be able to support a variety of original protocols of Ethernet, but also needs to support a variety of FC protocols, which are used to implement FC dynamic routing function and so on.

The Fabric Shortest Path First (FSPF) protocol is a common FC protocol used to implement the FC dynamic routing function, thus, in order to be able to implement FCoE, the existing technology usually needs to develop a corresponding FSPF system for an Ethernet that runs the FC protocol, thereby resulting in a higher development cost of FCoE.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
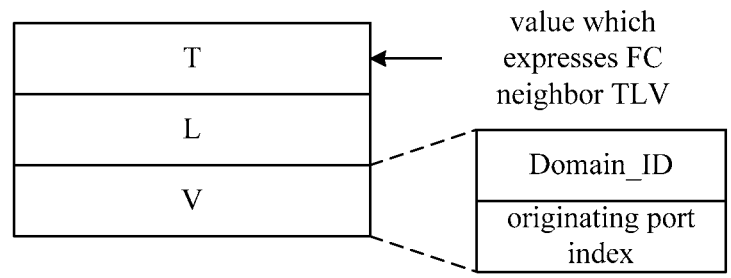
FIG. 1 is a schematic diagram of an FC neighbor TLV that is newly added into an ISIS protocol, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

In the present disclosure, an intermediate system to intermediate system (ISIS) protocol, which is used to support IPv4 and IPv6 in Ethernet, is modified so that the modified ISIS protocol can implement fabric channel (FC) dynamic routing function, thereby reducing the development cost needed to implement Fiber Channel over Ethernet (FCoE).

The ISIS protocol is an intra-domain dynamic routing protocol designed for a connectionless network protocol (CLNP) in an open system interconnect (OSI) protocol stack, and has good scalability.

A networking of the ISIS can be divided into two levels including a first level (Level-1) and a second level (Level-2). The Level-1 refers to common areas, and the Level-2 refers to backbone areas.

Each equipment may belong to both of the Level-1 and the Level-2. Each equipment that belongs to the Level-1 may only interconnect other network equipment that belong to the Level-1, while each equipment belonging to the level-2 is not limited by this interconnection. All of the network equipment that belong to the Level-2 must be interconnected.

The ISIS protocol includes following several types of packets:

Hello packet, which is used for initial neighbor discovery and maintaining neighbor relationships through periodic sending.

Sequence Number protocol data unit (PDU) (SNP), which is used to describe summary information of a link state Protocol Data Unit (LSP) to ensure integrity of the LSP-based routing information distribution and implement synchronization of a link-state database. SNP packets may be divided into complete sequence number PDU (CSNP) packets and partial sequence number PDU (PSNP) packets in accordance with specific functions. The CSNP packets describe information packets of all LSP heads, and the PSNP packets express responses and requests.

Link state Protocol Data Unit (LSP), which is used to describe states of links. When an originating equipment of an LSP packet belongs to Level-1, a link state described in the LSP packet is a state of a link in a local area. When an originating equipment of an LSP packet belongs to Level-2, a link state described in the LSP packet is the states of all reachable links.

Figure 6:
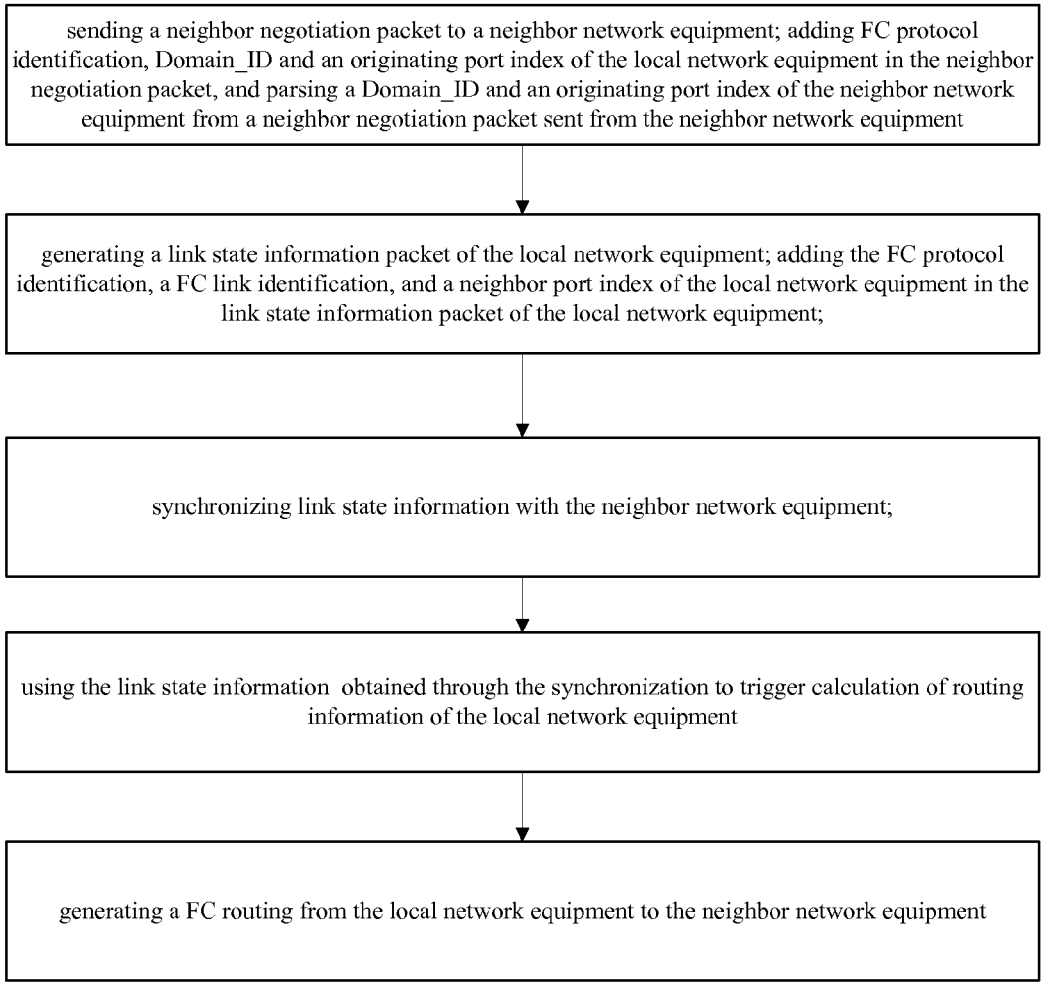
FIG. 6 is a flow diagram of a routing generation method for implementation of FCoE according to an example of the present disclosure.

Based on the above various types of packets, a basic working principle of the ISIS protocol is as follows. Referring to FIG. 6, each network equipment first uses neighbor negotiation packets to discover neighbor equipment. Then, for link states between the local network equipment and neighbor equipment, each network equipment sends a link state information packet containing link state information. After this, each network equipment has the link state information of all the network equipment through a synchronization mechanism. Finally, based on a link information database containing the link state information of all the network equipment, routing information from the local network equipment to all the other network equipment may be determined through specific algorithms, such as the Dijkstra algorithm.

In one example, each network equipment first uses Hello packets to discover neighbor equipment. Then, for link states between the local network equipment and neighbor equipment, each network equipment sends a LSP containing link state information. After this, each network equipment has the LSP of all the network equipment through a synchronization mechanism. Finally, based on a link information database containing the LSPs of all the network equipment, routing information from the local network equipment to all the other network equipment may be determined through specific algorithms, such as the Dijkstra algorithm.

In a specific implementation, the Hello packets, LSPs and SNPs, each carry encoding information that uses the Type-Length-Value (TLV) format. In the present disclosure, such encoding information is referred to as the TLV or referred to as the code-length-value (CLV). Different values are used to define different types of the TLV. The length of the TLV is used to show a length of the TLV and the value of the TLV records actual content of the TLV, that is, the value belongs to the most important part of the TLV.

A conventional TLV, which may be carried in the Hello packet mainly includes:

Area address TLV with a Type having a value of 1 and a Value carrying an area address of an originating equipment of the Hello packet.

Intermediate system neighbor TLV with a Type having a value of 6 and a Value carrying system identifiers of all neighbors of the originating equipment of the Hello packet, so as to facilitate establishment of verifying two-way neighbor relationship between the local network equipment and neighbors.

Verification TLV with a Type having a value of 8 and a Value carrying authentication information.

Filling TLV with a Type having a value of 10 and a Value carrying content used to fill Hello packets into a maximum transmission unit (MTU).

Protocol supported TLV with a Type having a value of 129 and a Value carrying identifications used to express protocols supported by the originating equipment of the Hello packet.

IP interface address TLV with a Type having a value of 132 and a Value carrying an IP address of an interface of the originating equipment of the Hello packet, so as to facilitate verifying of source addresses.

The present disclosure adds at least the following to the TLV, which may be carried in the Hello packet:

(1) A new identification used to express FC protocol is added in the Value of the protocol supported TLV.

Specifically, since the ISIS protocol is conventionally used to support IPv4 and IPv6, the Value of the protocol supported TLV usually only carries identifications to express corresponding connectionless network protocol (CLNP), IP protocol, and so on, supported by the originating equipment. However, in the present disclosure, a new identification used to express FC protocol is added in the Value to show that the originating equipment of the Hello packet supports the FC protocol.

In actual application, the identifications, which are carried in the Value of the protocol supported TLV and are used to express types of protocols, usually use Network Layer Protocol ID (NLPID). For example, if the originating equipment of the Hello packet supports CLNP, then the Value of the protocol supported TLV will carry an NLPID, i.e., CLNP_NLPID with a value of 0x81, which is used to express CLNP. If the originating equipment of the Hello packet supports IP, then the Value of the protocol supported TLV will carry an NLPID, i.e., IP_NLPID with a value of 0xcc, which is used to express IP.

According to an example of the present disclosure, if the originating equipment of the Hello packet supports FC, then the Value of the protocol supported TLV may carry an NLPID. i.e., FC_NLPID, which is used to express FC protocol; FC_NLPID may take a unique value, which is able to distinguish it from the NLPID used to express all of the other protocols.

(2) A new TLV used to express neighbor information is added in the Hello packet, and may be referred to as FC neighbor TLV in the present disclosure.

FIG. 1 is a schematic diagram of an FC neighbor TLV that is newly added into an ISIS protocol according to an example of the present disclosure. As shown in FIG. 1, a Type of the FC neighbor TLV may take a unique value, which is able to distinguish it from all of the other conventional TLVs. A Length of the FC neighbor TLV may be arbitrarily set according to actual needs and a Value of the FC neighbor TLV carries a Domain_ID of the originating equipment in FC and originating port index through which the originating equipment sends Hello packets.

A conventional TLV that may be carried in the LSP packet mainly includes:

Area TLV with a Type having a value of 1 and a Value carrying an area address group configured in an originating equipment of the LSP packet.

Intermediate system neighbor equipment TLV with a Type having a value of 2 and a Value carrying metric information of neighbor equipment belonging to Level-1 of the originating equipment of the LSP packet.

Terminal system neighbor equipment TLV with a Type having a value of 3 and a Value carrying all of the terminal systems.

Prefix adjacent equipment TLV with a Type having a value of 5 and a Value carrying inter-area routing information.

Authentication information TLV with a Type having a value of 10 and a Value carrying plaintext authentication information.

IP internal reachability TLV encoding with a Type having a value of 128 and a Value carrying a reachable IP address prefix list.

Protocol Supported TLV with a Type having a value of 129 and a Value carrying identifications used to express protocols supported by the originating equipment of the LSP packet.

IP external reachability TLV encoding with a Type having a value of 130 and a Value carrying routing information introduced by routing.

IP interface address TLV with a Type having a value of 132 and a Value carrying an IP address of an interface of the originating equipment of the LSP packet.

The present disclosure adds at least the following to the TLV, which may be carried in the LSP packet:

(1) A new identification used to express FC protocol is added in the Value of the protocol supported TLV, for example, FC_NLPID mentioned above.

(2) A new TLV used to express FC link information is added in the LSP packet, and may be referred to as a FC reachability entry in the present disclosure.

Figure 2:
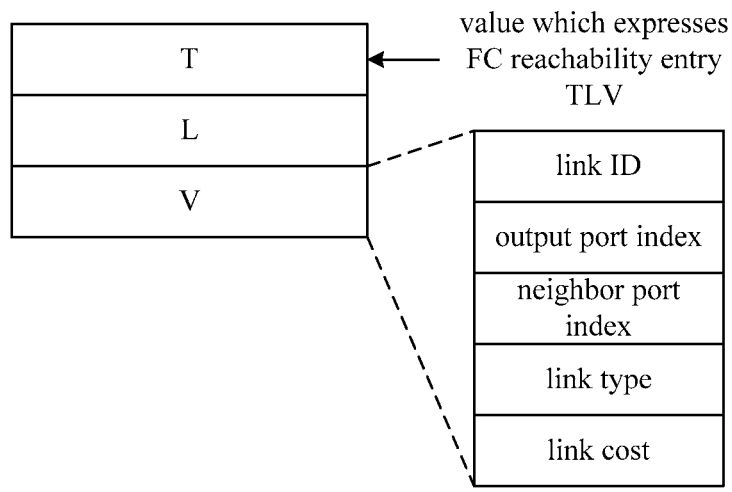
FIG. 2 is a schematic diagram of an FC reachability entry TLV that is newly added into the ISIS protocol, according to an example of the present disclosure.

FIG. 2 is a schematic diagram of an FC reachability entry TLV that is newly added into the ISIS protocol according to an example of the present disclosure. As shown in FIG. 2, a Type of the FC reachability entry TLV may take a unique value that is able to distinguish it from all of the other conventional TLVs. A Length of the FC reachability entry TLV may be arbitrarily set according to actual needs. A Value of the FC reachability entry TLV carries a Link ID of the originating equipment, output port index through which the originating equipment sends the LSP packet, neighbor port index of neighbor equipment of the originating equipment, link type, and link cost.

The Link ID may include a Domain_ID of a neighbor equipment at an opposite end of a corresponding link. The neighbor port index corresponding to each neighbor equipment is an originating port index of a Value of an FC Neighbor TLV of a Hello packet received by the neighbor equipment. The link type is such a type of value showing a switch link record of the FC protocol, which has been currently used. The link cost may be obtained through a calculation based on baud rate and management configuration factor of the link according to the conventional way of the FC protocol.

Based on the additions to the TLV that may be carried in the Hello packet and the LSP packet, the present disclosure provides a routing generation method and a routing generation apparatus for implementation of FCoE. The routing generation method and the routing generation apparatus for implementation of FCoE of the present disclosure will be described hereinafter in detail, respectively.

Figure 3:
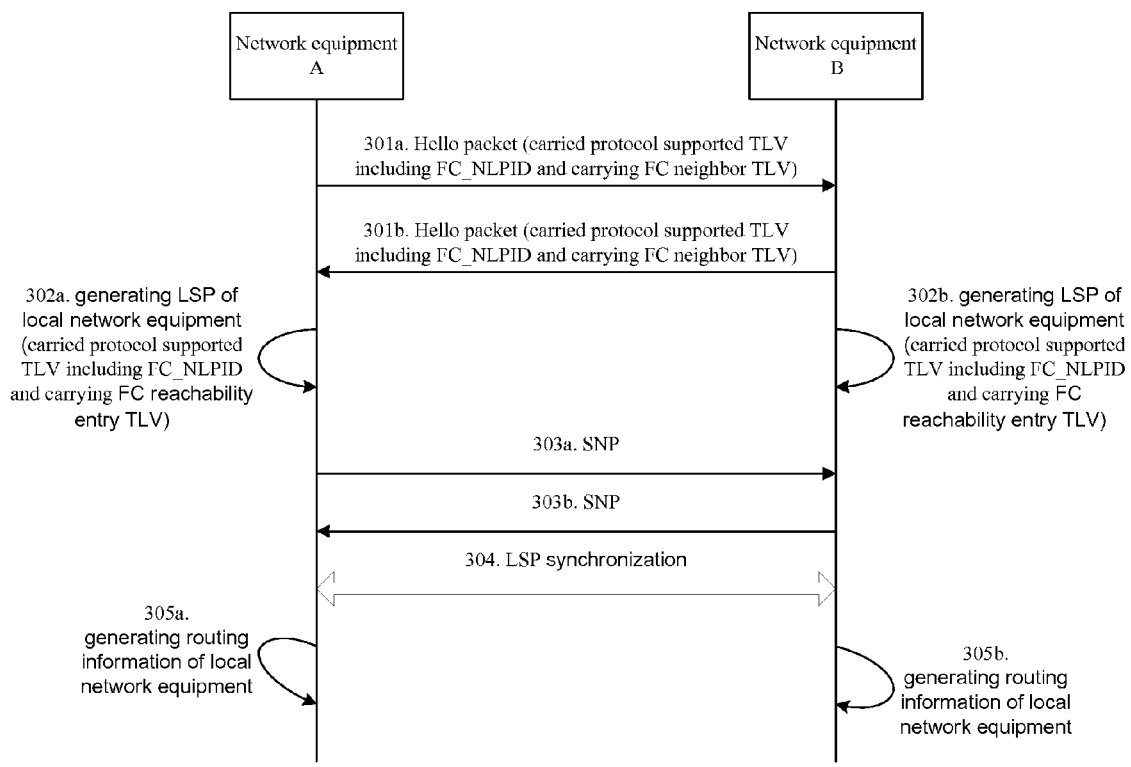
FIG. 3 is a flow diagram of a routing generation method for implementation of FCoE according to an example of the present disclosure.

FIG. 3 is a flow diagram of a routing generation method for implementation of FCoE according to an example of the present disclosure. As shown in FIG. 3, the routing generation method for implementation of FCoE of the present disclosure includes:

Block 301a and block 301b: send a Hello packet of an ISIS protocol to a network equipment B, the network equipment A and the network equipment B being neighbor equipment.

In block 301a, if the network equipment A supports the FC protocol, then:

An FC_NLPID is added in the Hello packet sent from the network equipment A to network equipment B, to express that the network equipment A supports the FC protocol. For example, the FC_NLPID may be carried in the protocol supported TLV of the Hello packet. A Domain_ID and originating port index of the network equipment A are added in the Hello packet sent from the network equipment A to the network equipment B. For example, the Domain_ID and originating port index of the network equipment A may be carried in the FC neighbor TLV of the Hello packet.

Accordingly, if the FC_NLPID is parsed from the protocol supported TLV of the Hello packet of the network equipment A, then the network equipment B may recognize that the neighbor network equipment A supports the FC protocol, and parses the Domain_ID and originating port index of the network equipment A from the FC neighbor TLV of the Hello packet of the network equipment A. When the network equipment B determines that both the network equipment A and the neighbor network equipment A support the FC protocol, the network equipment B will save the Domain_ID and originating port index of the network equipment A parsed from the FC neighbor TLV of the Hello packet of the network equipment A.

Similarly, in block 301b, if the network equipment B supports the FC protocol, a process the same as that of the network equipment A is performed. A Hello packet sent from the network equipment B to the network equipment A carries the FC_NLPID, the Domain_ID, and originating port index of the network equipment B, and the network equipment A will save the Domain_ID and originating port index of the network equipment B parsed from the FC neighbor TLV of the Hello packet of the network equipment B.

Block 302a and block 302b: generate, by the network equipment A and the network equipment B, their own ISIS LSP, respectively, according to an existing manner of the ISIS protocol.

In block 302a, if the network equipment A determines that both of the network equipment A and the neighbor network equipment B support the FC protocol, then: the network equipment A will add FC_NLPID in the generated LSP of the network equipment A, and the FC_NLPID may be carried in the protocol supported TLV of the LSP. In addition, the network equipment A will also add the link ID and neighbor port index of the network equipment A in the LSP of the network equipment A. The link ID of the network equipment A is the Domain_ID of the network equipment B. The neighbor port index of the network equipment A is the same as the originating port index of the network equipment B. The link ID and neighbor port index of the network equipment A may be carried in the protocol supported TLV of the LSP of the network equipment A.

Similarly, in block 302a, if the network equipment B determines that both of the network equipment B and the neighbor network equipment A support the FC protocol, then the network equipment B will add FC_NLPID, the link ID, and neighbor port index of the network equipment B in the generated LSP of the network equipment B. The FC_NLPID, the link ID, and neighbor port index of the network equipment B may be carried in the protocol supported TLV of the LSP of the network equipment B. The link ID of the network equipment B is the Domain_ID of the network equipment A. The neighbor port index of the network equipment B is the originating port index of the network equipment A.

Block 303a and block 303b: send a SNP packet of the ISIS protocol to the network equipment B.

Block 304: perform LSP synchronization between the network equipment A and the network equipment B.

Block 305a and block 305b: generate, by the network equipment A and the network equipment B, their own routing information, respectively, according to an existing algorithm of the ISIS protocol by using the LSP obtained through the synchronization.

In the block 305a: if the network equipment A determines that the LSP of the network equipment A and the LSP of the network equipment B each carry an FC_NLPID, the neighbor port index carried in the FC reachability entry TLV of the LSP of the network equipment A is the same as the originating port index of the neighbor network equipment B, and the neighbor port index carried in the FC reachability entry TLV of the LSP of the neighbor network equipment B is the same as the originating port index of the network equipment A, then the routing information obtained through the calculation contains a FC routing from the network equipment A to the network equipment B.

Similarly, in block 305b, if the network equipment B determines that the LSP of the network equipment B and the LSP of the network equipment A each carry an FC_NLPID, the neighbor port index carried in the FC reachability entry TLV of the LSP of the network equipment B is the same as the originating port index of the neighbor network equipment A, and the neighbor port index carried in the FC reachability entry TLV of the LSP of the neighbor network equipment A is the same as the originating port index of the network equipment B, then the routing information obtained through the calculation contains a FC routing from the network equipment B to the network equipment A.

At this point, the flow ends, and the routing information may be distributed by the network equipment A and the network equipment B, respectively.

It may be seen from the above description, based on the additions to the Hello packet and the TLV carried in the LSP of the ISIS protocol disclosed herein, that the routing generation method of the present disclosure may use the Hello packet of the ISIS protocol to implement neighbor discovering of the FC protocol, and use the LSP synchronization of the ISIS protocol to implement the link information synchronization of the FC protocol, thus, the FC routing may be generated without the FSPF. Therefore, FCoE may be implemented with a lower cost.

Figure 4:
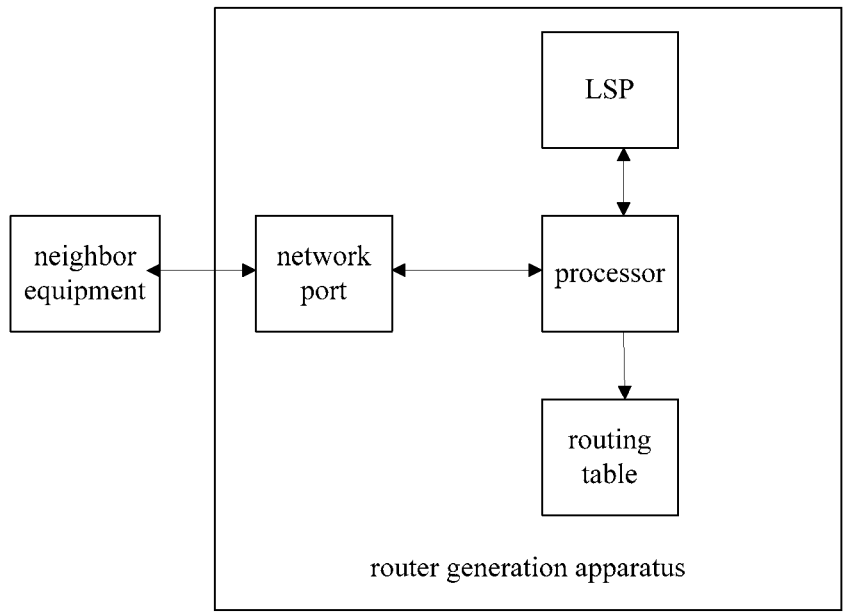
FIG. 4 is a schematic diagram of a routing generation apparatus for implementation of FCoE according to an example of the present disclosure.

FIG. 4 is a schematic diagram of a routing generation apparatus for implementation of FCoE according to an example of the present disclosure. As shown in FIG. 4, the routing generation apparatus for implementation of FCoE according to an example of the present disclosure includes: at least one network port that is connected with a neighbor equipment, an LSP including FC protocol identification, FC link identification of local apparatus and neighbor port index information, a routing table including routing information from the apparatus to the neighbor equipment, and a processor. The processor is used to send Hello packets of the ISIS protocol to the neighbor equipment through the network port; add the FC protocol identification, Domain_ID and originating port index of the local apparatus in a Hello packet sent to the neighbor equipment, send SNP of the ISIS protocol to the neighbor equipment, synchronize LSP with the neighbor equipment, use LSP obtained through the synchronization to trigger calculation of routing information of the local apparatus. The processor is also to, if the LSP of the neighbor equipment carries the FC protocol identification, the neighbor port index of the LSP of the local apparatus is the same as the originating port index of the neighbor equipment, and the neighbor port index of the LSP of the neighbor equipment is the same as the originating port index of the local apparatus, calculate and generate a FC routing from the local apparatus to the neighbor equipment.

The routing table saves the generated FC routing from the local apparatus to the neighbor equipment.

Further, the processor is further used to parse the Domain_ID and the originating port index of the neighbor equipment from the Hello packet of the neighbor equipment.

Specifically, the processor may include:

A first module used to send a Hello packet of the ISIS protocol to the neighbor equipment. If the local apparatus supports the FC protocol, the first module will add FC_NLPID in a Hello packet sent from the local apparatus to the neighbor equipment to show that the local apparatus supports the FC protocol, and the added FC_NLPID may be carried in the protocol supported TLV of the Hello packet. The first module will also add the Domain_ID and originating port index of the local apparatus in the Hello packet sent from the local apparatus to the neighbor equipment, and the added Domain_ID and originating port index of the local apparatus may be carried in the FC neighbor TLV of the Hello packet; if FC_NLPID is parsed from the protocol supported TLV of a Hello packet of the neighbor equipment, then the first module determines that the neighbor equipment supports the FC protocol, and parses the Domain_ID and originating port index of the neighbor equipment from the FC neighbor TLV of the Hello packet of the neighbor equipment.

A second module used to generate the local apparatus' LSP of the ISIS protocol. If both of the local apparatus and the neighbor equipment support the FC protocol, the second module will add FC_NLPID in the LSP of the local apparatus, the FC_NLPID added in the LSP of the local apparatus may be carried in the protocol supported TLV of the LSP, and the second module will also add the link ID and neighbor port index of the local apparatus in the LSP of the local apparatus. The link ID of the local apparatus is the Domain_ID of the neighbor equipment, the neighbor port index of the local apparatus is the originating port index of the neighbor equipment. The link ID and neighbor port index added in the LSP of the local apparatus may be carried in the protocol supported TLV of the LSP of the local apparatus.

A third module used to send a SNP packet of the ISIS protocol to the neighbor equipment.

A fourth module used to perform LSP synchronization between the local apparatus and the neighbor equipment.

A fifth module used to generate routing information of the local apparatus according to an existing algorithm of the ISIS protocol by using the LSP obtained through the synchronization.

If the protocol supported TLV of the LSP of the local apparatus and the protocol supported TLV of the LSP of the neighbor equipment each carry an FC_NLPID, the neighbor port index carried in the FC reachability entry TLV of the LSP of the local apparatus is the same as the originating port index of the neighbor equipment, and the neighbor port index carried in the FC reachability entry TLV of the LSP of the neighbor equipment is the same as the originating port index of the local apparatus, then the fifth module calculates and generates an FC routing from the local apparatus to the neighbor equipment.

The routing information obtained through the calculation by the fifth module may be distributed to the local apparatus.

The processor may further include a sixth module between the first module and the second module. The sixth module may be used to, when both of the local apparatus and the neighbor equipment support the FC protocol, save the Domain_ID and originating port index of the neighbor equipment carried in the FC neighbor TLV of the Hello packet, which is received by the local apparatus from the neighbor equipment, so that the second module may use the sixth module when generating the LSP and the fifth module may use the sixth module when generating the routing information.

It may be seen from the above description, based on the additions to the Hello packet and the TLV carried in the LSP of the ISIS protocol, the routing generation apparatus of the present disclosure may use the Hello packet of the ISIS protocol to implement neighbor discovering of the FC protocol, and use the LSP synchronization of the ISIS protocol to implement the link information synchronization of the FC protocol. Thus, the FC routing may be generated without the FSPF. Therefore, FCoE may be implemented with a lower cost.

Figure 5:
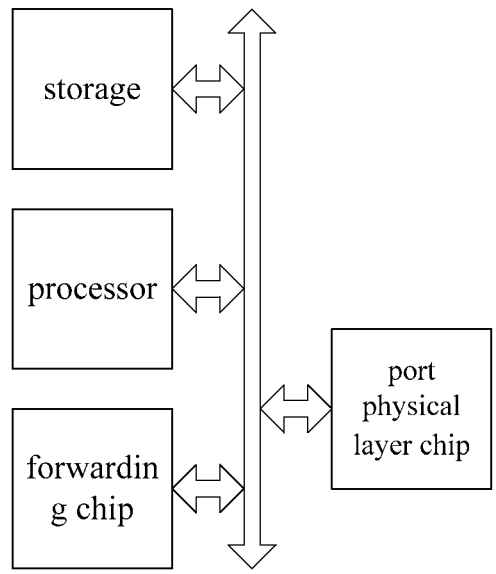
FIG. 5 is a hardware frame diagram of a hardware frame of a switch that uses the routing generation method of the present disclosure, according to an example of the present disclosure.

FIG. 5 is a hardware frame diagram of a hardware frame of a switch that uses the routing generation method of the present disclosure. As shown in FIG. 5, a hardware frame of a switch usually includes a processor, such as a CPU connected with a bus, a storage, such as memory, a forwarding chip, and a port physical layer chip.

When the processor discovers a neighbor equipment via a Hello packet, the processor may obtain an LSP of all of the switches through synchronization and may obtain routing information via calculation, and may then distribute the routing information to the forwarding chip. Specifically, the processor may be used to send a Hello packet of the ISIS protocol to the neighbor equipment, add the FC protocol identification, Domain_ID, and originating port index of the local switch in a Hello packet sent from the local switch to the neighbor equipment, add the FC protocol identification, FC link identification, and neighbor port index information of the local switch to the LSP of the local switch, and synchronize the LSP with the neighbor equipment. The processor may also use the LSP obtained through the synchronization to generate routing information of the local switch. If the LSP of the neighbor equipment carries the FC protocol identification, the neighbor port index of the LSP of the local switch is the same as the originating port index of the neighbor equipment, and the neighbor port index of the LSP of the neighbor equipment is the same as the originating port index of the local switch, then the processor is to calculate and generate a FC routing from the local switch to the neighbor equipment.

The storage is used to save the LSP generated by the local switch and the routing information generated by the local switch. Further, the storage may also be used to save a variety of temporary data generated when the processor calculates the routing and processes other elements.

The forwarding chip is used to receive packets through the port physical layer chip, and report packets, such as the Hello packet, the SNP, and the LSP, which need to be processed by the processor to the processor, and forward packets, which need to be directly forwarded according to the distributed routing information through the port physical layer chip.

The port physical layer chip is used to drive a port of the switch as an ingress port to receive packets, or as an egress port to send packets.

When forming an actual network based on the ISIS protocol, levels, to which the local apparatus/switch and neighbor equipment belong, does not affect the generated FC routing, but in order to be consistent with IP protocol, which is originally supported by the ISIS protocol as far as possible, the routing generation method and the routing generation apparatus may be applied to devices that belong to Level-2, i.e., the local apparatus/switch and neighbor equipment preferably belong to Level-2 of the ISIS protocol.

The methods, units, and apparatus described herein may be implemented by hardware, machine-readable instructions or a combination of hardware and machine-readable instructions. Machine-readable instructions used in the examples disclosed herein may be stored in a storage medium readable by multiple processors, such as a hard drive, a CD-ROM, a DVD, a compact disk, a floppy disk, a magnetic tape drive, RAM, ROM, or other proper storage device. Or, at least part of the machine-readable instructions may be substituted by specific-purpose hardware, such as custom integrated circuits, gate arrays, FPGAs, PLDs, and specific-purpose computers and so on.

A non-transitory machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples along with some of variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A routing generation method for implementation of Fiber Channel over Ethernet (FCoE), applied in a network that includes a plurality of network equipment, each of the plurality of network equipment supporting fiber channel (FC) protocol, the method comprising:
   sending, from a local network equipment to a neighbor network equipment, a neighbor negotiation packet that includes an FC protocol identification, a Domain_ID and an originating port index of the local network equipment, wherein the FC protocol identification includes a value to express a Network Layer Protocol ID (NLPID) of the FC protocol;
   receiving, from the neighbor network equipment, a neighbor negotiation packet that includes the FC protocol identification, a Domain_ID and an originating port index of the neighbor network equipment;
   generating, by the local network equipment, a link state information packet that includes the FC protocol identification, a FC link identification, and a neighbor port index of the local network equipment;
   synchronizing link state information of the local network equipment with the neighbor network equipment; and
   if the neighbor port index of the link state information packet of the local network equipment is the same as the originating port index of the neighbor network equipment, and a neighbor port index of the link state information packet of the neighbor network equipment is the same as the originating port index of the local network equipment, calculating and generating a FC routing from the local network equipment to the neighbor network equipment.

2. The method of claim 1, wherein the FC link identification of the local network equipment is the Domain_ID of the neighbor network equipment and the neighbor port index of the local network equipment is the originating port index of the neighbor network equipment.

3. The method of claim 1, further comprising:
   in response to a determination that both the local network equipment and the neighbor network equipment support the FC protocol, saving, by the local network equipment, the Domain_ID and the originating port index of the neighbor network equipment carried in the neighbor negotiation packet.

4. The method of claim 1, wherein the neighbor negotiation packet is a Hello packet of an intermediate system to intermediate system (ISIS) protocol, and wherein the link state information packet is carried in a link state Protocol Data Unit (LSP) packet.

5. The method of claim 4, wherein each Hello packet includes a protocol supported Type-Length-Value (TLV) carrying a corresponding FC protocol identification, and an FC neighbor TLV carrying a corresponding Domain_ID and a corresponding originating port index, wherein the LSP of the local network equipment and the LSP of the neighbor network equipment each carry a protocol supported TLV carrying a corresponding FC protocol identification and an FC reachability entry TLV carrying a corresponding FC link identification and a corresponding neighbor port index.

6. The method of claim 5, wherein the FC reachability entry TLV is further used to carry output port index, link type, and link cost.

7. A routing generation apparatus of a local equipment for supporting Fiber Channel (FC) protocol, comprising:
a network port that is connected with a neighbor equipment;
a routing table including routing information from the local equipment to the neighbor equipment; and
a processor to:
send, to the neighbor equipment through the network port, a neighbor negotiation packet that includes an FC protocol identification, a Domain_ID and originating port index of the local equipment, wherein the FC protocol identification in the neighbor negotiation packet includes a value to express a Network Layer Protocol ID (NLPID) of the FC protocol,
send, to the neighbor equipment, link state information in a Sequence Number protocol (SNP) including the FC protocol identification, a FC link identification, and a neighbor port index of the local equipment,
synchronize link state information with the neighbor equipment, and
if the neighbor port index of the link state information packet of the local equipment is the same as an originating port index of the neighbor equipment, and a neighbor port index of a link state information packet of the neighbor equipment is the same as the originating port index of the local equipment, calculate and generate an FC routing from the local equipment to the neighbor equipment.

8. The routing generation apparatus of claim 7, wherein the processor is further to:
receive a neighbor negotiation packet from the neighbor equipment, including the FC protocol identification, a Domain_ID of the neighbor equipment, and the original port index of the neighbor equipment; and
parse the Domain_ID and the originating port index of the neighbor equipment from the neighbor negotiation packet of the neighbor equipment,
wherein the FC link identification of the local apparatus is the Domain_ID of the neighbor equipment and the neighbor port index of the local apparatus is the originating port index of the neighbor equipment.

9. The routing generation apparatus of claim 7, wherein the neighbor negotiation packet is a Hello packet of an intermediate system to intermediate system (ISIS) protocol, and wherein the link state information packet is a link state Protocol Data Unit (LSP) packet.

10. The routing generation apparatus of claim 9, wherein each Hello packet includes a protocol supported Type-Length-Value (TLV) carrying corresponding FC protocol identification, and an FC neighbor TLV carrying a corresponding Domain_ID and a corresponding originating port index, wherein the LSP of the local equipment and the LSP of the neighbor equipment each carry a protocol supported TLV carrying the corresponding FC protocol identification and an FC reachability entry TLV carrying a corresponding FC link identification and a corresponding neighbor port index.

11. The routing generation apparatus of claim 10, wherein the FC reachability entry TLV is further used to carry output port index, link type, and link cost.

12. A switch applied in a network that includes a plurality of network equipment, each of the plurality of network equipment supporting fiber channel (FC) protocol, the switch comprising:
a processor;
a non-transitory computer readable medium storing instructions that when executed by the processor cause the processor to:
send a Hello packet to a neighbor network equipment, the Hello packet including an FC protocol identification, a Domain_ID and an originating port index of the switch, wherein the FC protocol identification includes a value to express a Network Layer Protocol ID (NLPID) of the FC protocol,
add the FC protocol identification, an FC link identification, and neighbor port index information of the switch to a link state Protocol Data Unit (LSP) of the switch,
synchronize the LSP with the neighbor network equipment, and
if an LSP of the neighbor network equipment carries the FC protocol identification, the neighbor port index information of the LSP of the switch is the same as an originating port index of the neighbor network equipment, and a neighbor port index of the LSP of the neighbor network equipment is the same as the originating port index of the switch, calculate and generate an FC routing from the switch to the neighbor network equipment; and
a storage to save the LSP generated by the switch and the routing information generated by the switch.

* * * * *